March 17, 1931.                L. ALEWEL                  1,796,426
                    SAFETY SHADE AND ROLLER THEREFOR
                Filed Sept. 12, 1929      2 Sheets-Sheet 1
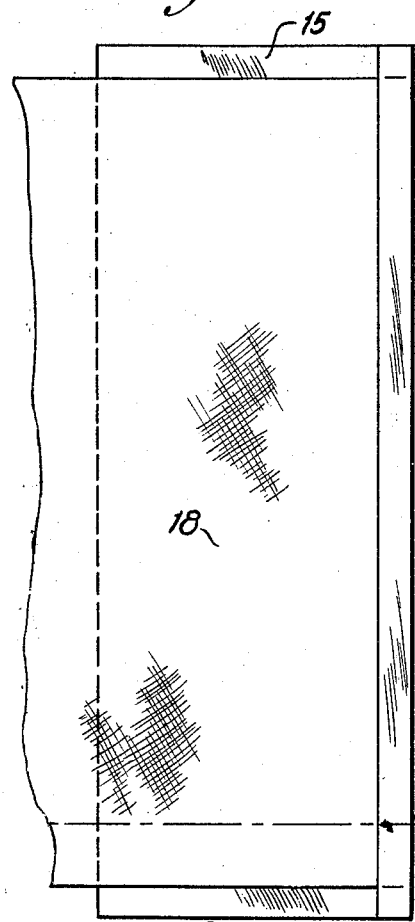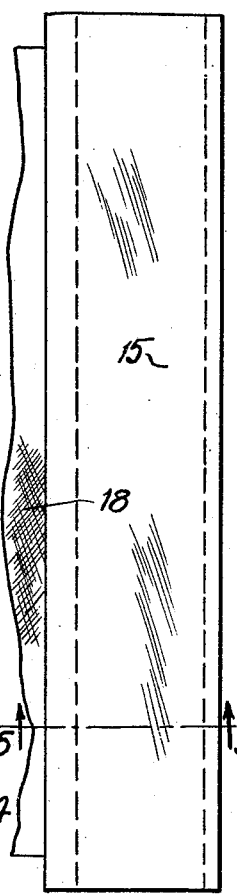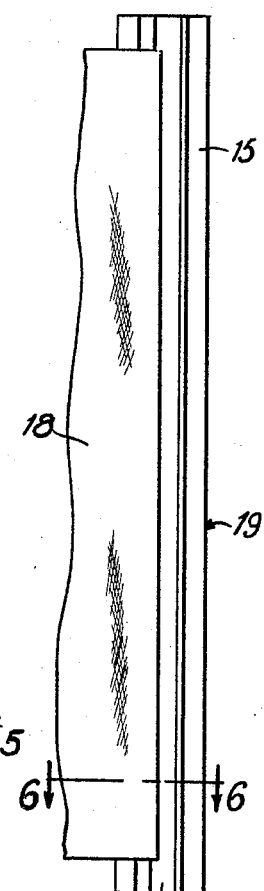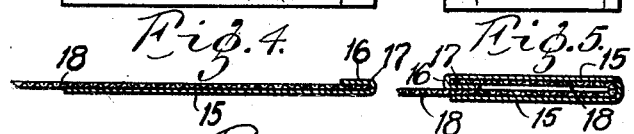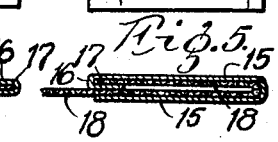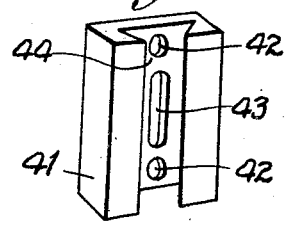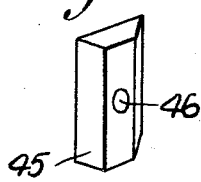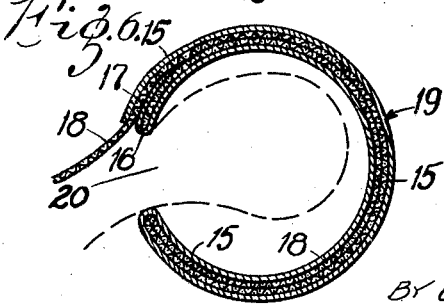
INVENTOR:
LOUIS ALEWEL.
By Edward E. Logan
ATTORNEY.

March 17, 1931. L. ALEWEL 1,796,426
SAFETY SHADE AND ROLLER THEREFOR
Filed Sept. 12, 1929 2 Sheets-Sheet 2
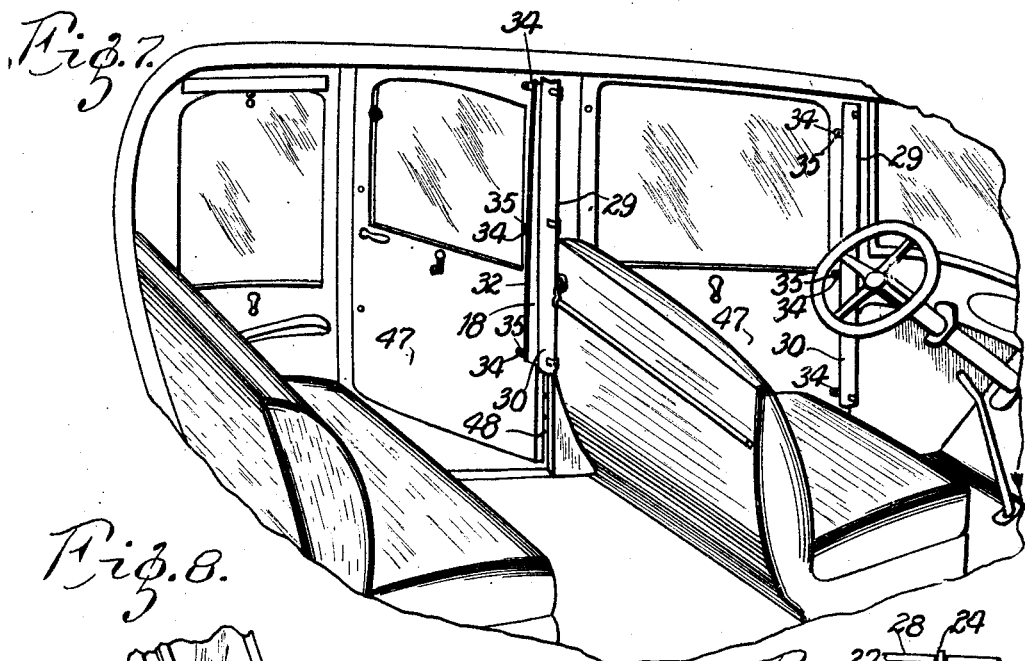
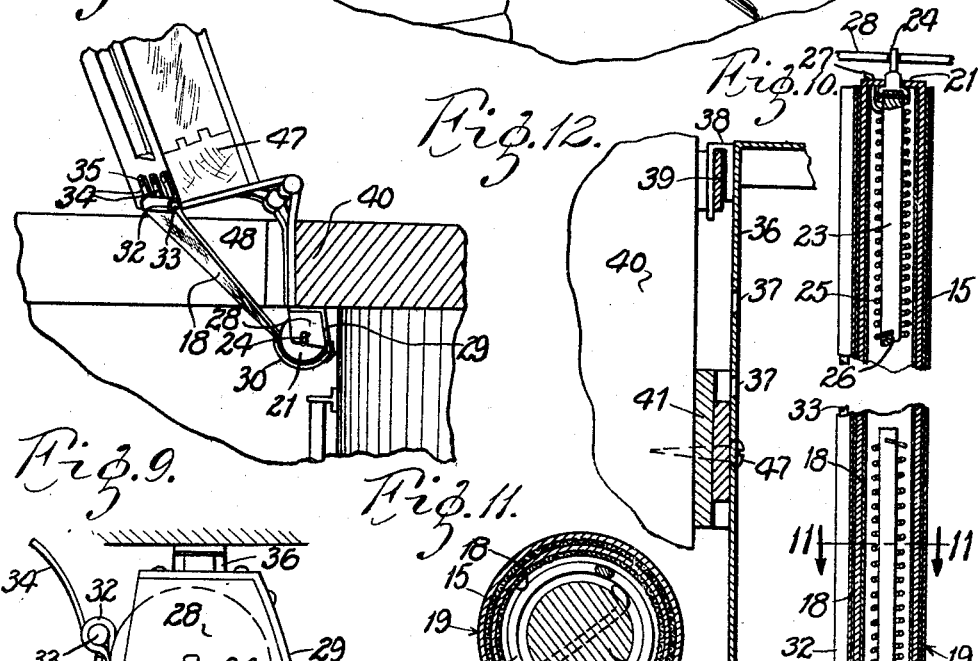
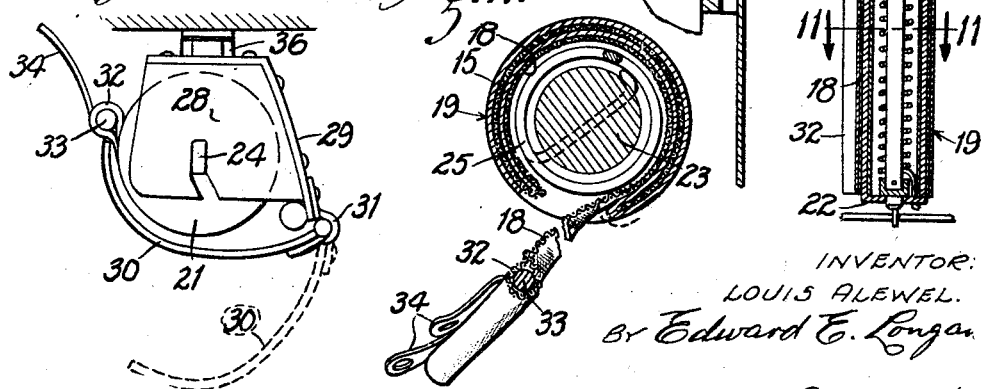
INVENTOR:
LOUIS ALEWEL.
BY Edward E. Longan
ATTORNEY.

Patented Mar. 17, 1931

1,796,426

UNITED STATES PATENT OFFICE

LOUIS ALEWEL, OF ST. LOUIS, MISSOURI

SAFETY SHADE AND ROLLER THEREFOR

Application filed September 12, 1929. Serial No. 392,067.

My invention relates to improvements in safety shades and rollers therefor, and has for its primary object a shade which is designed to have one part attached to a door frame adjacent the hinges of the door and the other part to the door itself so that when the door is opened the resulting space caused by the hinges will be fully covered thereby preventing persons from getting their fingers in this opening or crack. This makes my device especially useful on automobile doors and also around the house where small children are present. Serious injury has frequently resulted by persons riding in automobiles getting their fingers in this opening and then having some one forcibly slam the door when closing it. It also frequently happens in homes where small children are that a sudden draft will close the door and mash the child's fingers, but by the use of my device it will be impossible to get the fingers in this opening.

A further object is to construct a shade roller of sheet metal and in which the fabric forming the shade is firmly secured, the fabric also passing loosely around the springs in the roller thereby deadening the sounds of the springs and making the operation of the roller practically noiseless.

A still further object is to construct a shade roller of sheet metal which is so arranged or made adjustable that the diameter of the roller at one end can be made larger than the diameter at the other end thus giving a tapered roller. This makes my shade and roller especially adaptable for automobiles because the opening between the door and door frame at the hinges when the door is opened is invariably much wider at the bottom than at the top, and by having the roller tapered from one end to the other I have found that the shade will roll up and unroll evenly. This is not possible where a roller of equal diameter throughout is used.

In the drawings:

Fig. 1 is a plan view of the metal strip with the fabric placed thereon showing the first step of construction;

Fig. 2 is a similar view showing the second step in the construction;

Fig. 3 is a side elevation of the roller after it has been formed;

Fig. 4 is a section taken on the line 4—4 of Fig. 1;

Fig. 5 is a section taken on the line 5—5 of Fig. 2;

Fig. 6 is an enlarged cross section of the roller taken on the line 6—6 of Fig. 3;

Fig. 7 is a fragmental perspective view of the interior of an automobile showing my roller in position;

Fig. 8 is an enlarged fragmental sectional view of a portion of an automobile showing the door open and illustrating the manner in which the space between the door and door frame at the hinges is covered;

Fig. 9 is an enlarged top plan view of the roller and the supporting casing therefor;

Fig. 10 is a longitudinal section taken through the roller and casing;

Fig. 11 is an enlarged cross section taken on the line 11—11 of Fig. 10;

Fig. 12 is a fragmental vertical section of a portion of the casing showing the manner of attaching the same to a door frame;

Fig. 13 is an enlarged perspective view of one of the retaining sockets; and

Fig. 14 is an enlarged perspective view of one of the tongues which are adapted to fit into the retaining sockets.

In the construction of my device I employ a strip of sheet metal 15 which is preferably noncorrosive and may be either of galvanized iron, zinc, aluminum, or other noncorroding material.

The sheet 15 has its one edge bent over indicated by the numeral 16 so as to form a pocket 17. In the pocket 17 is inserted one edge of a strip of fabric 18. This fabric may be of various material. After the edge of the strip of fabric 18 is inserted, the portion 16 is pressed down tightly so as to bind the fabric and sheet metal strip together. It will be noted from Fig. 1 that the fabric 18 is of less width than the sheet metal strip 15 so as to leave a projecting edge on each side of the fabric. After the portion 16 has been thus pressed down, the strip 18 is folded upon itself as illustrated in Figs. 2 and 5 thus bringing two faces of fabric together.

After this folding the resulting strip is again tightly pressed together. The strip 18 is then rolled so as to form a cylindrical member 19 as illustrated in Figs. 3 and 6 so that the cylindrical member will have metal on the outside, metal on the inside, and two thicknesses of fabric between these metallic walls, the cylinder being left open on its top and bottom and also having a longitudinally extending opening 20, which is clearly shown in Fig. 6.

The loose portion or extending portion of the strip of fabric 18 is then pushed inside of the longitudinally extending opening 20 as indicated by dotted lines in Fig. 6, after which caps 21 and 22 are secured in the ends of the cylindrical or tubular member 19. These caps carry a rod 23 which rod is provided at one end with a rectangular projection 24, this projection being similar to the projections on a shade roller.

Surrounding the rod 23 is a spring 25, which has one end 26 secured to the rod, the opposite end 27 being secured in the cap. The spring, however, is surrounded by the fabric which has been inserted or pushed through the opening 20 so that it will be surrounded almost practically by a flexible casing of fabric and will not be permitted to contact with the inner metallic wall. It will be noted from Fig. 10 that I employ two springs, one for the top and one for the bottom. These springs may be placed under tension in any conventional manner and the projections 24 fitted into the plates 28 carried by the housing 29.

The housing 29 is provided with a hinged door 30, which is preferably held in closed position by means of springs 31.

In the outer end of the fabric 18 is formed a loop 32 through which a rod 33 extends. This rod may be of any rigid material and serves to stiffen the outer edge of the fabric. The loop 32 may also be provided with tabs 34, or with openings which are designed to be secured over buttons or other suitable fastening means 35, which are to be attached to the door.

The casing 37 is provided with a member 36, this member having a series of openings 37 therein. The member 36 is also provided at its upper end with a hook 38, which is designed to be hooked into a loop 39 carried by the door frame 40. This loop is to be placed in position first and regulates the height at which the upper end of the shade is positioned.

Along the edge of the door frame 40 are placed a plurality of retaining sockets 41. These sockets are provided with openings 42 through which fastening means may be inserted to secure them in position and with a slot 43.

The retaining sockets are provided with a dovetailed slot 44 in which tongues 45 are adapted to fit. These tongues are provided with an opening 46 so that a screw or similar fastening means 47 can be inserted through certain of the openings 37 in the portion 36 of the housing, pass through the slot 43, and enter the door frame 40. My purpose in providing the slot 43 in the retaining socket is so that the screw 47 can pass through the member 36, the tongue 45, the retaining socket 41, and into the door frame without the necessity of making an extremely nice adjustment of the retaining socket. I have found it necessary to provide means, such as the spaced openings 37 in the member 36, to permit a certain amount of adjustability vertically of the retaining tongues so that they will not interfere in any way with the hinges.

The installation of my device is as follows:

The first step is to secure the strap or socket 39 in position and then regulate the position of the retaining sockets along the door frame or edge of the door in such a manner that their securing means will not interfere in any way with the hinges but will also be in certain alignment with the openings 37 in the member 36.

After these positions have been marked off, the housing 27 is removed and the retaining sockets secured in position. The housing is then again placed in its first position, the tongues 45 inserted in the retaining sockets, and then the screws or other fastening means 47 driven home thus rigidly securing the housing in position.

The hinged door 30 is then opened and the roller together with the shade placed in position, it being understood, of course, that the springs at either end of the roller have been wound up so that they will have a tendency to cause the fabric to wind on the roller.

The fastening means 35 are secured to the door and the tabs 34 secured thereto, and the device is ready for operation.

As the door 47 is opened, the fabric member 18 unrolls from the roller, as illustrated in Fig. 8, and stretches across the space 48 formed between the door frame 40 and the door 47 and, being tautly stretched, prevents the ready entrance of fingers or hands into this opening, it being understood, of course, that during the unrolling of the fabric from the roller additional tension will be set up in the springs and upon closing of these doors this tension will cause the roller to re-roll the fabric thereon.

When my advice is used to protect an opening which is of equal width from top to bottom, the caps 21 and 22 will be made of the same diameter so that the roller will be a true cylinder but where there is a difference in the length of hinges, such as is the case in automobiles where it is necessary to take care of the curvature of the body, this opening is much narrower at the top than at the bottom, and in this instance the cap 22 is made larger so that a tapering roller will result. In this way when unwinding the fabric, the bottom part of the roller, being of larger diameter, will permit more fabric to unwind on each revolution than the upper portion, even though the loop 32 be maintained in one position, and in rewinding the bottom portion will take up a proportionately greater amount of fabric on each revolution than the top. So, therefore, I obtain what may be termed a straight rolling of the fabric under all conditions.

In other words, I am enabled to draw a shade straight across an angularly-shaped opening without putting any twisting tendency on the fabric. This would not be possible where a straight cylindrical roller is used.

Another important feature of my device is that the shade is practically completely enclosed in a housing and when this housing is mounted in an automobile, as aforementioned, it provides with an extra hand grip for passengers while entering or leaving the car and prevents the passengers, needing such assistance, from grasping the doors and pulling themselves into the car, or letting themselves out thereby, and thus obviates the danger of springing such doors.

My improved shade and roller can readily be made in various widths so that it can be utilized in sleeping cars to stretch across the lower portion of the window and leave the upper portion unobstructed.

It can also be used as a ventilator for windows in homes and office buildings, in that it can be placed on one side of a window frame and stretched completely across the window, eliminating drafts but still, at the same time, permit air to freely enter the room thereby obviating the use of ordinary ventilators which are commonly placed underneath windows, or the plate glass which is used in office buildings as a deflector to cause the current of air, which enters a raised window to be directed upwardly so as to prevent this current of air from disturbing papers on the desk.

The shade, if desired, especially when being used as a ventilator, may be made of translucent material, such as pyralin or it may be made of screen or other porous material.

It is also obvious that by my construction the shade and the housing therefor can be made to harmonize with the interior finish of an automobile. The housing being of metal construction may be either so painted as to harmonize with the interior finish or it may be covered with cloth, the same kind as is used for the interior construction or upholstery so that when my device is in position in an automobile it will conform with the interior finish of the vehicle.

Having fully described my invention, what I claim is:—

1. A safety shade comprising a hollow sheet metal roller having a longitudinal opening extending throughout its length, a sheet of fabric secured at one end to said roller and having a portion thereof extending into the interior of the roller, caps carried by the ends of said roller, and a winding spring carried by one of said caps, said spring being surrounded by the fabric projecting into the roller.

2. A safety shade comprising a hollow sheet metal roller having a longitudinal opening extending throughout its length, a sheet of fabric secured at one end to said roller and having a portion thereof extending into the interior of the roller, caps carried by the ends of said roller, one of said caps being of greater diameter than the other whereby a tapering roller is formed, and a winding spring carried by one of said caps, said spring being surrounded by the fabric projecting into the roller.

3. A safety shade comprising a hollow metallic roller formed of a double thickness of sheet metal and having a longitudinally extending opening therein throughout its length, a sheet of flexible material of less width than the length of said roller carried thereby intermediate its ends, said sheet of fabric being located between the double thickness of sheet metal and extending into the interior of said roller and therearound, caps for closing the ends of said roller, trunnions carried by said caps for supporting said roller, a winding spring carried by one of said trunnions, said spring being located within the roller and being supported by said flexible fabric for permitting contact between said spring and roller, and brackets adapted to be secured adjacent each end of said roller for receiving said trunnions and preventing the same from turning whereby said roller is held in position and the tension on said spring is increased and decreased as the fabric unwinds and winds about said roller.

4. A safety shade comprising a hollow metallic roller formed of a double thickness of sheet metal and having a longitudinally extending opening therein throughout its length, a sheet of flexible material of less width than the length of said roller carried thereby intermediate its ends, said sheet of fabric being located between the double thickness of sheet metal and extending into the interior of said roller and therearound, caps for closing the ends of said roller, one of said caps being of greater diameter than the other whereby a tapered roller is formed, trunnions carried by said caps for supporting said roller, a winding spring carried by one of said trunnions, said spring being located within the roller and being supported by said flexible fabric for permitting contact between said spring and roller, and brackets adapted to be secured adjacent each end of said roller for receiving said trunnions and preventing the same from turning whereby said roller is held in position and the tension on said spring is increased and decreased as the fabric unwinds and winds about said roller.

5. A safety shade comprising a hollow sheet metal roller having a longitudinal opening extending throughout its length, a sheet of fabric secured at one end to said roller and having a portion thereof extending into the interior of the roller, caps carried by the ends of said roller, a winding spring carried by one of said caps, said spring being surrounded by the fabric projecting into the roller, a housing for said roller, and means for securing said housing in position.

6. A safety shade comprising a hollow metallic roller formed of a double thickness of sheet metal and having a longitudinally extending opening therein throughout its length, a sheet of flexible material of less width than the length of said roller carried thereby intermediate its ends, said sheet of fabric being located between the double thickness of sheet metal and extending into the interior of said roller and therearound, caps for closing the ends of said roller, trunnions carried by said caps for supporting said roller, a winding spring carried by one of said trunnions, said spring being located within the roller and being supported by said flexible fabric for permitting contact between said spring and roller, brackets adapted to be secured adjacent each end of said roller for receiving said trunnions and preventing the same from turning whereby said roller is held in position and the tension on said spring is increased and decreased as the fabric unwinds and winds about said roller, a housing for said roller, and means for securing said housing in position.

7. A safety shade comprising a hollow metallic roller formed of a double thickness of sheet metal and having a longitudinally extending opening therein throughout its length, a sheet of flexible material of less width than the length of said roller carried thereby intermediate its ends, said sheet of fabric being located between the double thickness of sheet metal and extending into the interior of said roller and therearound, caps for closing the ends of said roller, one of said caps being of greater diameter than the other whereby a tapered roller is formed, trunnions carried by said caps for supporting said roller, a winding spring carried by one of said trunnions, said spring being located within the roller and being supported by said flexible fabric for permitting contact between said spring and roller, brackets adapted to be secured adjacent each end of said roller for receiving said trunnions and preventing the same from turning whereby said roller is held in position and the tension on said spring is increased and decreased as the fabric unwinds and winds about said roller, a housing for said roller, and means for securing said housing in position.

In testimony whereof I have affixed my signature.

LOUIS ALEWEL.